Dec. 15, 1964 J. T. MULLIN 3,161,882
GALVANOMETER USING ELECTROSTATIC ORIFICE RECORDING MEANS
Filed Aug. 5, 1960 3 Sheets-Sheet 1
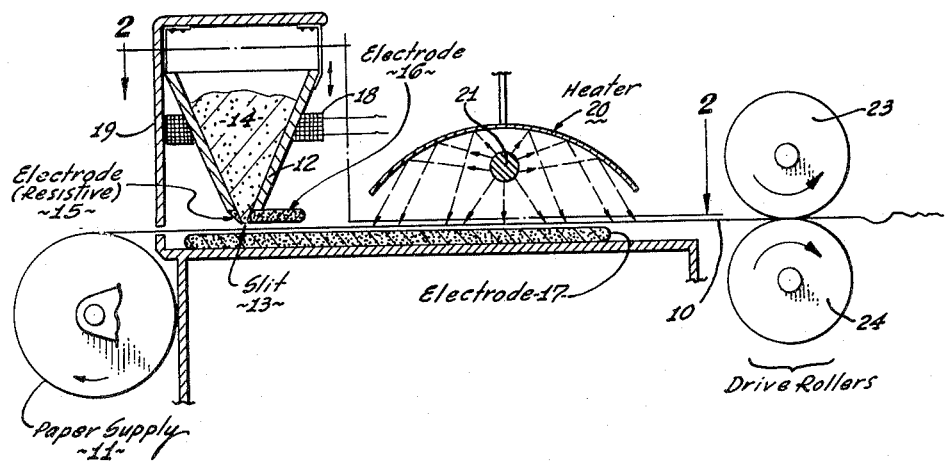
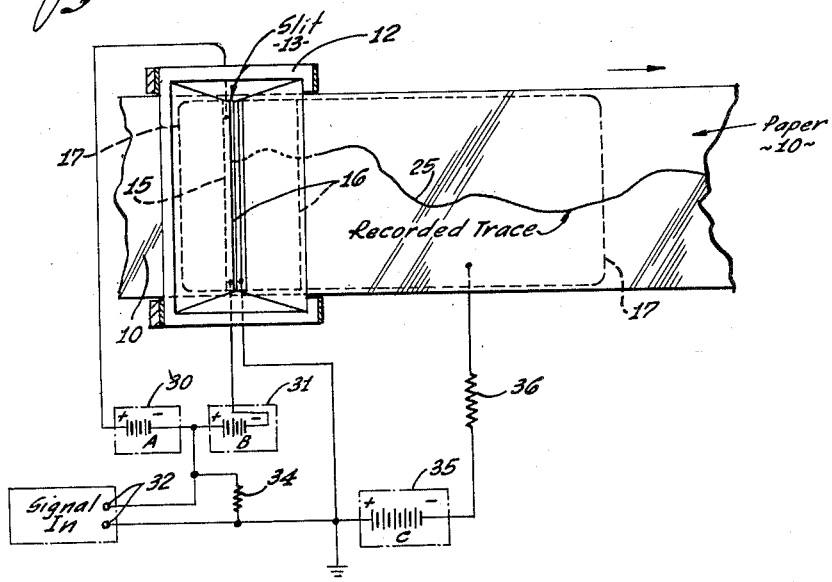
INVENTOR.
John T. Mullin

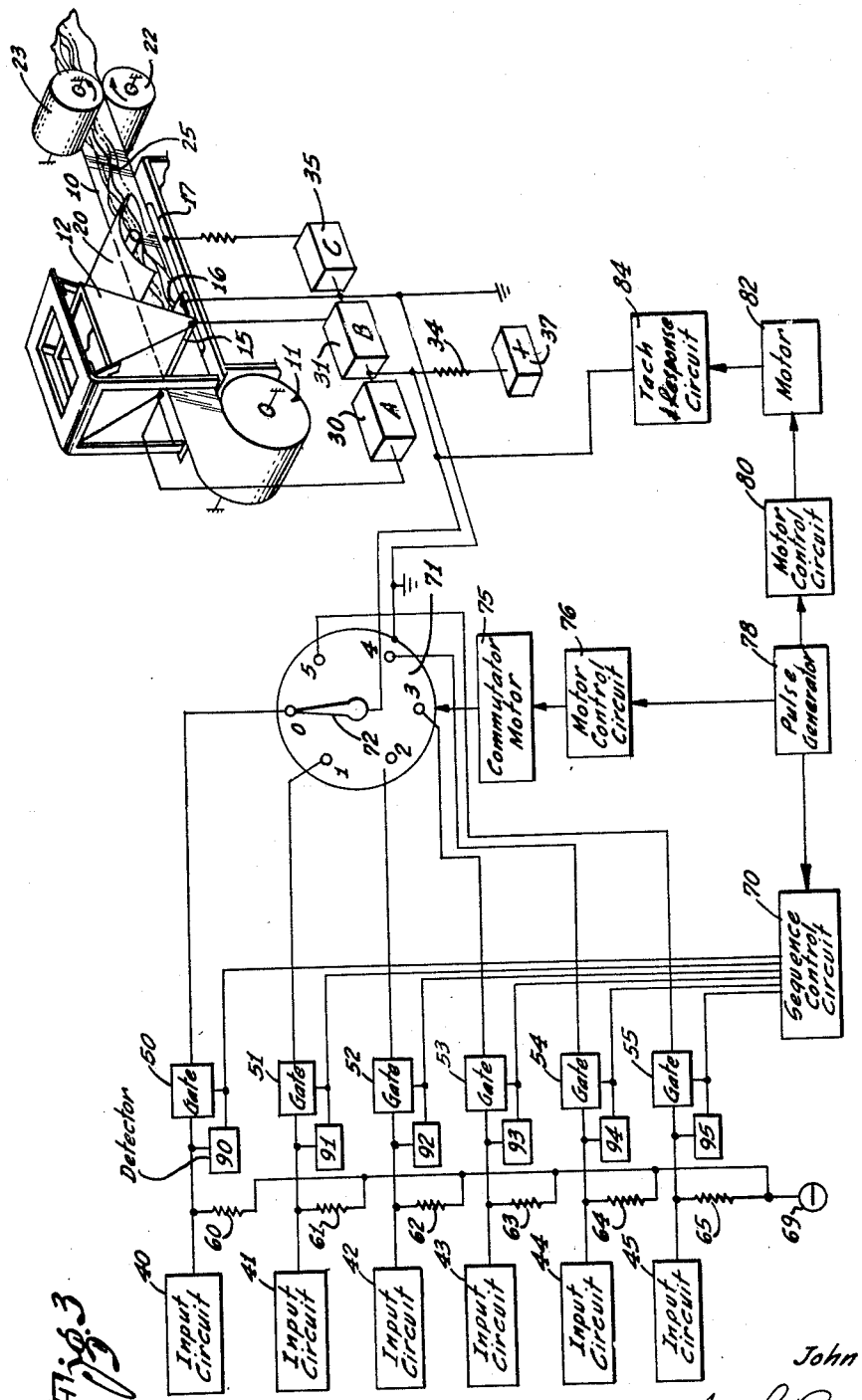

INVENTOR:
John T. Mullin

United States Patent Office 3,161,882
Patented Dec. 15, 1964

3,161,882
GALVANOMETER USING ELECTROSTATIC
ORIFICE RECORDING MEANS
John T. Mullin, Beverly Hills, Calif., assignor to Minnesota Mining and Manufacturing Company, St. Paul, Minn., a corporation of Delaware
Filed Aug. 5, 1960, Ser. No. 47,653
21 Claims. (Cl. 346—74)

This invention relates to oscillographs and, more particularly, to an electrostatic recording system for producing visible curves representing varying quantities.

An oscillograph is an apparatus for producing a written or visible curve representing variable current, voltage or other electrical quantity. In one such apparatus, electrical oscillations in a circuit cause electro-magnetic vibrations of a filament bearing a mirror which reflects a light-beam onto a moving photographic film. Other oscillographs utilize a slave coil which carries a pen to record the magnitude of the varying signal on a moving paper chart. Some apparatus, which provide a visible indication of a varying electrical quantity, utilize cathode ray tubes and are generally referred to as oscilloscopes even when a recording is produced. To produce a permanent recording, either photographic or inking apparatus are utilized in conjunction with the cathode ray tubes.

In a specific illustrative embodiment of this invention, photographic equipment, inking pens and optical systems, with their accompanying limitations of slow speed and complexity, are not required to provide a graphic representation of a varying electrical quantity. In fact, the recording system of this invention is effectively non-mechanical with the only effectively moving component being the recording medium. High frequency responses are, accordingly, readily achieved.

The illustrative embodiment of the invention is an electrostatic recording system which does not require specifically designed and relatively expensive recording mediums such as are required in magnetic and photographic recording systems. Ordinary paper, illustratively, which is white or light in color, may be utilized as the recording medium. The "ink" consists of fine particles of powder which are not electrically conductive and which may be black or dark in color for contrast against the paper.

A hopper containing the powder is positioned adjacent the paper which may be moving relative to the hopper. The hopper has a thin slit facing the paper which may be transversely aligned relative to the paper movement. The slit is defined by two electrodes one of which may be made of a material of uniform electrical resistivity to develop an electrostatic potential gradient and the other of which may be made of electrically conductive material. At any transverse position across the paper a potential difference between the two electrodes causes the powder at that position to adhere electrostatically, particle by particle across the slit so as not to fall through the slit. Biasing means may be coupled to the two electrodes for normally providing a potential difference between all opposing points on the two electrodes except at the center transverse position of the slit across the paper. The powder falls through the slit only at the zero potential position.

Features of this invention pertain to the provision of means for varying the zero potential position along the slit in accordance with a varying input signal. The transverse position of the powder through the slit is, accordingly, varied in accordance with the input signal to provide for the oscillograph trace on the paper. A third electrode is positioned relative to the paper opposite the hopper slit for attracting the particles directly to the paper and for holding them against the paper until they are fused by heat to the paper.

Further features of this invention relate to the provision of means for modulating the trace intensity by injecting control signals to the first pair of electrodes. The control signals may be utilized to code the trace on the paper in accordance with a pattern of dashes and dots for its ready identification. Means may be provided for simultaneously recording a number of curves representing different varying input signals utilizing the same recording slit, each of which is differently coded. Simultaneously recording is achieved utilizing means for sequentially sampling the different varying input signals.

Still further features of this invention relate to the provision of means for automatically blanking the powder trace when the tape is stationary or when an input signal is not being received for recording. The powder is, accordingly, utilized only when a recording is to be made.

Other features of this invention relate to the provision of apparatus for recovering the different input signals from the traces on the tape. Line scanning means is provided for scanning the tape and the signals are separated by commutating means synchronized with the line scanning means and the movement of the tape.

Still further features of this invention pertain to means for continuously modulating each of the different traces by varying its thickness in accordance with a different distinguishing signal. The different signals may be different frequencies. The thickness of the trace may be varied by varying the potential on the third electrode which attracts the powder to the paper. The modulating means is synchronized with the sequential sampling means so as to vary the thickness of each of the traces in accordance with the distinguishing frequency. The variation in thickness may be utilized to provide a visual indication or coding of the different traces.

Further advantages and features of this invention will become apparent upon consideration of the following description when read in conjunction with the drawings wherein:

FIGURE 1 is a schematic elevation view of a portion of the electrostatic oscillograph or recording system of this invention;

FIGURE 2 is a partially schematic top view and a partially circuit representation of one embodiment of the electrostatic oscillograph or recording system of this invention;

FIGURE 3 is a partially functional representation and partially pictorial view of a second embodiment of this invention wherein a number of different visible curves are recorded;

Figure 4:
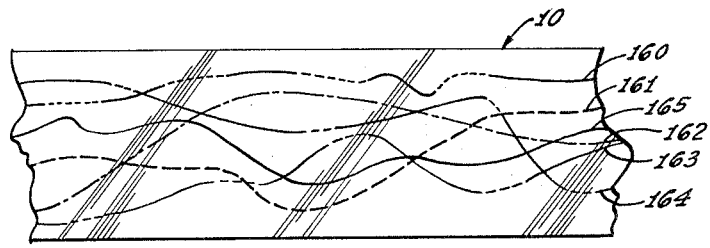
FIGURE 4 is a top view of a portion of the recording medium utilized in the electrostatic oscillograph of this invention.

Referring first to FIGURES 1 and 2, the recording medium may be a paper tape 10 which is pulled from a paper supply or roll 11. The paper may be light in color or white for providing a contrasting background for the relatively dark curves to be recorded on the paper 10. The tape 10 is driven by a pair of rollers 23 and 24 adjacent a hopper 12 which is filled with a fine powder 14. The powder 14 may be dark in color or black and is made of a material which is not electrically conductive. Illustratively, the powder 14 may be a finely divided pigmented and resinous powder such as the seeds of the Lyco Podium plant to which is applied a resinous and pigmented material. Another illustrative powder is finely divided corn meal. Any fine powder which is made of a non-conductive material and which can be electrostatically charged can be utilized.

The resinous material may be on the powder or the paper may be coated with a resinous material. As is hereinafter described, the resinous material functions to bind or fuse the powder to the paper when the resinous material is heated. Similarly, either the powder or the paper may be pigmented to provide for the contrast.

The hopper 12, which holds the powder 14, defines a slit 13 adjacent the paper tape 10 to selectively permit the passage of powder to the paper tape 10. The slit 13 is between two electrodes 15 and 16 at the bottom of the hopper 12. Both electrodes 15 and 16 extend transversely across the tape 10, with the electrode 15 being made of electrically resistive material and the electrode 16 being made of an electrically conductive material. Illustratively, the electrode 15 may be made of a composition of a silicon resin and carbon particles. The electrode 16, which may be made of copper or aluminum, has a horizontal flange portion extending horizontally over the paper tape 10. As is hereinafter described in detail, the powder falls through the slit 13 only at a transverse position where the potential difference between opposite points on the electrodes 15 and 16 is approximately zero volts.

The hopper 12 may be vibrated at a relatively high frequency rate by a vibrator coil 18 which is supported by the structure 19. The vibration, which may be in a vertical direction and of low amplitude, insures that the particles of the powder 14 fall through the slit 13 of the hopper 12 at a zero potential point.

The nature of the powder 14 is such that if it is allowed to fall on the paper tape 10, it remains as a loose powder thereon until subjected to heat by a heater including a heat source 21 and a reflector 20. The heat binds the powder to the paper 10 to provide a permanent dark impression thereon.

As illustrated in FIGURE 2, a potential difference is applied across the ends of the resistive electrode 15. A positive source of potential 30 applies a predetermined potential to one end of the electrode 15 and a negative potential source 31 provides a predetermined potential to the other end of the electrode 15. The junction between the two sources 30 and 31 may be coupled to ground by a resistor 34. The two potential sources 30 and 31 are illustrated in FIGURE 2 as batteries though it is evident that they could be other power sources for providing direct potentials. The electrode 16 is coupled to ground so that it has a uniform potential approximately equal to the potential at one position of the electrode 15.

The potential at the successive positions of the electrode 15 varies from a positive maximum at one end to a negative maximum at its other end. If the two sources 30 and 31 are of equal magnitude, the center position of the electrode 15 is at zero potential. At any transverse position across the tape 10 (except at the center) the adjacent points on the electrodes 15 and 16 across the slit 13 are at different potentials. Particles of powder 14 do not fall through the slit 13 to the paper tape 10 at such positions. The powder 14 is caused to adhere particle to particle across the slit 13 between the different potential points of electrodes 15 and 16 due to electrostatic adherence. The particles of powder are not conductive and become electrostatically charged across the slit.

Suppose, for example, that a particular pair of opposing points on the electrodes 15 and 16 are at potentials which differ by 10 volts with the point on the electrode 15 being more positive. The successive adjacent particles of the power 14 across the thin slit 13 between the two opposing points are electrostatically charged in accordance with the 10 volt potential gradient across the slit 13. The particles closer to the point on the electrode 15 are more positively charged and those closer to the electrode 16 are more negatively charged. The particles at different distances across the slit 13 between the two opposing points are at different electrostatic potentials in accordance with the 10 volt gradient. The different electrostatic charges on the particles across the slit 13 cause them to electrostatically adhere to each other so that none of the particles between the two opposing different potential points can fall through the slit 13 to the paper tape 10.

At opposing points where the potential difference is zero, such electrostatic adherence does not occur so that the particles of powder 14 can fall through the slit 13 to the paper tape 10. The particles might tend to diffuse through the slit 13 with some degree of uncertainty except for the presence of a third electrode 17. The electrode 17, which is made of electrically conductive material, has a high negative potential charge due to a battery 35 in FIGURE 2 to develop an electrostatic field for attracting the particles of powder falling through the slit 13. The battery 35 is connected by a resistor 36 to the electrode 17. The particles, accordingly, fall vertically and cling to the surface of the paper 10 under the influence of the electrostatic field provided by the electrode 17.

The electrode 17 may have a rectangular shape extending along the tape 10 from the hopper 12 to the heater which fuses the particles of powder to the tape. As described above, the electrode 16 has a horizontal portion extending along the tape 10. The potential of the electrode 16 is at ground potential whereas the potential of the plate 17 is at a substantial negative potential greater in magnitude than the magnitude of any negative potential along the electrode 15. The electrostatic field formed between the two electrodes 16 and 17 causes the particles of powder to be forced against the paper tape 10 and to remain thereat until fused by the heater.

As depicted in FIGURE 2, an input circuit may introduce a varying signal to the terminals 32; one of which is connected to ground, the other of which is connected to the junction of the sources 30 and 31. The input signal is applied in this manner across the resistor 34 connected between the junction of the sources 30 and 31 and ground. When a signal is applied to the input terminals 32, it shifts the particular transverse position along the slit 13 at which a zero potential difference exists between opposing points of the electrodes 15 and 16. Since the particles of powder 14 can only drop through at the opposing points of zero potential difference, a trace of powder is left on the paper 10 as the paper 10 moves adjacent the slit 13 which is an exact picture or an oscillogram of the input signal waveform. The dimensions of the slit and the particle size in part determine the thickness of the trace recorded on the paper 10. Illustratively, the average particle size may be 0.0001 inch and the width of the slit 13 may be 0.001 inch. As described above, the powder deposited on the paper 10 and forming the oscillogram or trace is held against the upper surface of the paper 10 due to the effect of the electrode 17 and moved adjacent the heater consisting of the lamp 21 and reflector 20. The powder is fused by the heater onto the paper to form a permanent indication or trace of the input signal. As described above, either the powder or the paper may be coated with a resinous material. The resinous material is softened and partially melted by the heater to fuse the patricles to the paper.

The orifice formed between the zero potential opposing points through which the particles fall depends upon a number of factors including the potential gradient along the electrode 15; the potential difference between the electrodes 16 and 17; the size of the particles of powder 14; and the width of the slit 13. The size of the orifice through which the powder falls determines the thickness of the trace recorded on the paper tape 10. Illustratively, if the magnitude of the charge on the electrode 17 is increased, the size of the orifice is effectively increased because the resulting electrostatic field tends to cause more particles to fall through the slit. In fact, as the magnitude of the charge on the electrode is increased, it tends to overcome the electrostatic adherence of the particles between opposing points of the electrodes 15 and 16 at small potential differences. As is hereinafter described, in reference to FIGURES 5 and 7, the thicknesses of different traces may be varied and the variation may be utilized to recover the different input varying signals from such traces.

In the embodiment of the invention shown in FIGURES 1 and 2, a single trace is recorded on the tape 10. In the embodiment of the invention depicted in FIGURE 3, a number of different traces, illustratively six, may be simultaneously recorded on the tape 10. A number of components in FIGURE 3 are similar to components described above in reference to FIGURES 1 and 2. These components, which are at the right in FIGURE 3, have been given similar reference designations.

The six different varying input signals to be recorded on the tape 10 are provided respectively from six input circuits 40 through 45 at the left of FIGURE 3. The six signals are sequentially sampled by a commutator 71. A pulse generator 78 provides pulses at a particular repetition rate to a motor control circuit 76 which controls the speed of a commutator motor 75. The commutator 71 driven by the motor 75 is, accordingly, driven at a particular speed determined by the pulse generator 78.

The commutator 71 has an armature 72 which successively contacts six terminals 0 to 5 of the commutator. The input circuits 40 through 45 may be connected directly to the six terminals 0 through 5 of the commutator 71, or, as shown in FIGURE 3, they may be gated by six individually associated gates 50 through 55. The gates 50 through 55 are enabled and disabled under control of a sequence control circuit 70 which may be driven by the pulse generator 78. Each of the gates 50 through 55 is operated in accordance with a different pattern or predetermined sequence, with the pattern providing for a visible identification of the signal. For example, the gate 50 may be cyclically enabled for 10 milliseconds and disabled for 3 milliseconds. The particular timing sequence or pattern for each of the gates 50 through 55 is different and under control of the sequence control circuit 70.

FIGURE 4 illustrates six different illustrative codings for the different traces, each being determined by a pattern of enabling and disabling the associated gate. The control circuit 70 may comprise six different programmers, not shown, for providing the control potentials to the associated gates.

The input signals are applied from the circuits 40 through 45 respectively across the resistors 60 through 65 which are connected to the source 69. The source 69 determines the level of the sampled signals to the recording apparatus. The signals across the resistors 60 through 65 are provided through the gates 50 through 55 to the terminals 0 to 5 of the commutator 71. The sampling speed of the commutator 71 may be high compared to the coding of the signals under control of the circuit 70. Illustratively, the commutator may sample each of the signals at a repetition rate of 100 microseconds. The maximum sampling speed depends upon the speed limitations of the commutating means and greater speeds can be affected.

In addition to being provided to the gates 50 through 55, the six input signals are also provided to six individually associated detector circuits 90 through 95. The circuits 90 through 95 respectively detect the presence of the input signals and inhibit the associated one of the gates 50 through 55 when a signal is not present. For example, if an input signal is not provided from the circuit 40, its absence is detected by the circuit 90 which inhibits the gate 50. The gate 50 remains inhibited as long as an input signal is not provided from the circuit 40. The detector circuits 90 through 95 may each include a pair of oppositely poled diodes, not shown, and timing means for delaying the inhibiting potential to the associated one of the gates 50 through 55. The timing means provides for the inhibition of the associated gate if the input signal is absent for more than a predetermined interval.

Assuming that all six input signals are present, they are successively sampled by the commutator 71 and the sequentially sampled signals are provided by the commutator 71 to the junction of the potential sources 30 and 31. The junction of the potential sources 30 and 31 is connected by the resistor 34 to a positive potential source 37. In FIGURE 2, said junction is connected to ground instead of to a positive potential source. In the embodiment shown in FIGURE 2, in the absence of an input signal, a trace along the center of the tape 10 is provided. In the embodiment of FIGURE 3, however, a trace is not provided in the absence of a signal from the commutator 71.

The potential source 37 raises the level of the potential gradient across the resistive electrode 15 so that normally a potential difference exists between each point on the electrode 15 and its opposing point on the electrode 16 across the slit 13. Accordingly, powder is not normally provided through the slit 13 to the tape 10. The magnitude of the potential from the source 37 may be greater than the magnitude of the potential from the source 30. When the gate 50 is disabled, the disabling potential from the source 37 prevents a trace from being formed when the commutator armature 72 engages terminal 0 of the commutator 71. With the gate 50 closed, there is no change of potential at the electrode 15 when the output of the gate 50 is sampled.

In this manner, if a signal is not present so that the gate 50 is disabled, a trace is not provided. Similarly, if any of the other five input signals is absent, the associate gate is disabled and a trace is not formed therefor. Further, during the disabling periods of each coding or pattern under control of the circuit 70, the respective gates 50 to 55 are disabled so that traces are not provided during these periods.

During the time, however, that one of the gates 50 to 55 is enabled, a trace is provided on the tape 10 corresponding to its associated input signal. The sampled signal includes a biasing potential from the source 69 and the input varying signal. The magnitude of the source 69 may be the same as that of the source 37 but opposite in sign. The effect of the two sources effectively cancels so that the zero potential point or orifice due to the biasing potentials is now at the center of the tape 10. The input varying signal is superimposed on the D.C. biasing potential to control the orifice position along the slit 13.

The rise time of changing the orifice position is very high because it is not limited by the necessity for any mechanical movements. Accordingly, the potential conditions across the electrode 15 which determine the electrostatic orifice position can change quite rapidly without affecting the accuracy of the recording. As each input signal is sequentially sampled, a small amount of powder is deposited on the tape 10 at transverse positions corresponding to the instantaneous magnitude and polarity of the input signal. Between samplings or when the associated one of the gates 50 to 55 is inhibited, a trace is not provided for the associated input signals.

In this manner, each of the six traces, depicted in FIGURE 4, is pieced together bit by bit with the powder provided by succesive samplings of the same input signal appearing to form a continuous trace. The visual continuity occurs because of the high repetition rate of the samplings. Actually, a trace is provided during a maximum of 16.66 percent of the time and so is formed of small spots strung together as spaced beads on a necklace. The trace formed thereby is periodically interrupted for relatively long periods compared to the spacing between samplings due to the coding by the control circuit 70.

In this manner, all six input signals are simultaneously recorded on the moving paper tape 10, each being coded in accordance with a different distinctive identifying pattern. The signals can readily be recorded without coding by disconnecting the control circuit 70 from the gates 50 to 55 so that they are not disabled thereby.

The pulse generator 73 in FIGURE 3 also controls the speed of the motor 82 driving the tape 10 through a motor control circuit 82. The tape 10, accordingly, is moved at a particular speed related to the speed of the commutator 71. The motor 82 drives a tachometer, not shown, included in a tachometer-response circuit 84 which provides a disabling potential across the resistor 34 if the motor 84 is not rotating in a predetermined range of speeds. If the tape 10 is not moving, a positive disabling potential is, accordingly, provided for blanking the traces. Such a signal may also be developed directly from the tape 10 utilizing photocell means, not shown, instead of the tachometer.

In addition to being able to simultaneously record a number of different varying signals, the present invention also includes apparatus for reproducing the recorded signals and for separating them to recover the different input varying signals.

Figure 6:
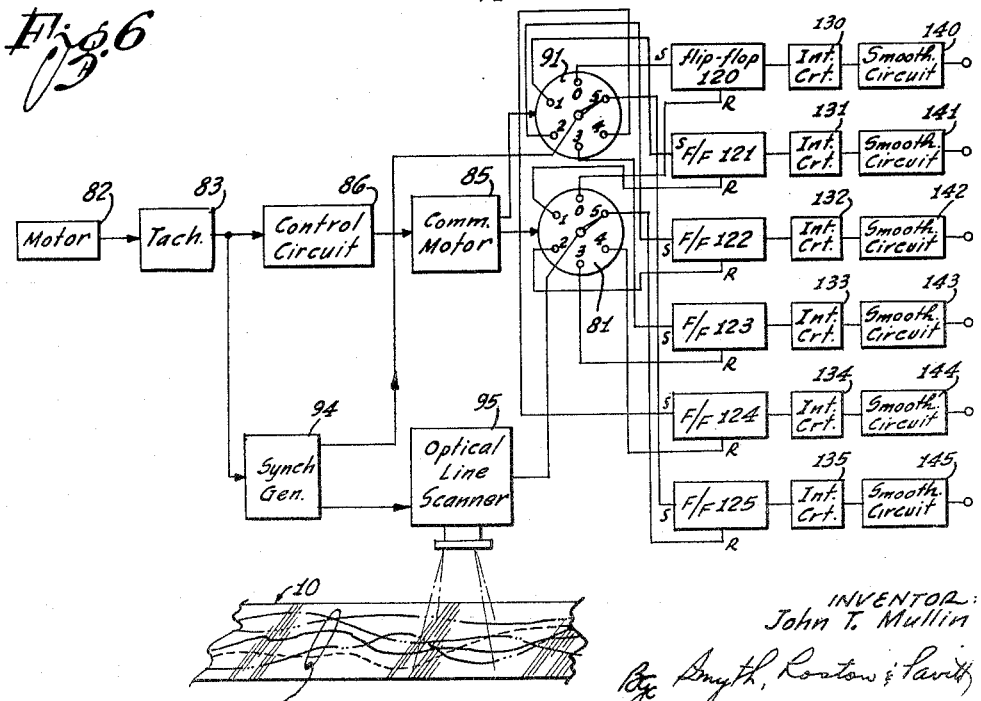
FIGURE 6 is a functional representation of one emmodiment of a reproducing system for recovering the input signals from the curves recorded on the recording medium.

FIGURE 6 illustrates an arrangement for automatically recovering the input signals from the recorded paper tape 10. Referring first to FIGURE 6, the tape 10 is scanned by an optical scanner 95 which is a line scanner illustratively containing a cathode-ray tube, not shown. The cathode ray tube scans the moving tape 10 line by line. The scanning may be in a single dimension across the tape, as it need not be shifted by the scanner 95 line by line. The successive lines are scanned at a spacing determined by the speed of the paper tape 10.

The paper tape 10 is driven by the motor 82, briefly mentioned above in reference to FIGURE 3. The motor 82 drives a tachometer 83 which develops a signal having a frequency related to the speed of the motor 82, and, therefore, of the paper tape 10. The tachometer 83 drives a pair of commutators 81 and 91 by means of a motor control circuit 86 and a commutator motor 85. The two commutators 81 and 91 are, accordingly, driven in synchronism at a speed related to the speed of movement of the paper tape 10. The speed of the commutators 81 and 91 relative to the speed of the paper tape 10 is exactly the same as the relative speed between the communtator 71 and the paper tape 10 in FIGURE 3.

The signals from the line scanner 95, mentioned above, are provided to the rotataing armature of the commutator 81. The line scanner 95 is driven by a control circuit or synchronizing generator 94 which is in turn driven by the tachometer 83 so that the line scanner 95 is synchronously operated with the commutators 81 and 91. The line repetition rate of the scanner 95 is, however, greater than the rotating speed of the commutator 81. Illustratively, the repetition rate of the line scanner 95 may be six times the rotating speed of the commutators 81 and 82.

At the beginning of each scanning line of the scanner 95 a pulse is provided from the generator 94 to the rotating armature of the commutator 91. During each rotation of the armature of the commutator 91, six pulses are accordingly provided thereto from the scanner 95. A pulse is received at the armature of the commutator 91 just as it engages each of the six terminals 0–5. The six terminals 0–5 of the commutator 91 are coupled indivdulaly to the set terminals of six flip-flop circuits 120 through 125. The flip-flop circuits 120 through 125 are, accordingly, set in order at the beginning of the successive scanning lines of the line scanner 95. The selection of the particular flip-flop circuit is determined by the position of the rotating armature of the commutator 91. Actually, the repetition rate of the scanner 95 may be many times that of the speed of the commutators 81 and 91. The set pulses from the generator 94 are the first provided to the flip-flop circuit 120 for an interval during which the armature of the commutator contacts its associated terminal 0. Then, as the armature moves to its associated terminal 1, the set pulses are provided to the flip-flop circuit 121. The flip-flop circuit, which is set, remains in its set condition for an interval determined by the signals developed by the line scanner 95. A pulse is developed at the scanner 95 when a trace on the tape 10 is scanned.

As described above, each of the six traces on the tape 10 actually consists of small dots along the trace like beads on a chain. Due to the commutation in the recording system of FIGURE 3, each trace has one dot at each sixth position, with the dots for the different traces being staggered. During a scan across the tape 10, the line scanner 95, therefore, develops only a single pulse because a spot of only one of the six traces is traversed by the scanning means. When the dots for the six traces are recorded, the commutator 71 in FIGURE 3, which is synchronized with the movement of the tape 10, determines which of the six input signals is being sampled and, therefore, the identity of the recorded dot. In FIGURE 6, the commutators 81 and 91, which are synchronized with the paper tape 10, determine which one of the flip-flops 120 through 125 is to be used and, accordingly, the identity of the trace being scanned. The identity of the scanned trace is in this manner determined on a time basis in accordance with the position of the dot being scanned in the direction of movement of the tape 10.

The transverse position of the scanned dot of the trace on the tape 10 determines the duration that the selected flip-flop remains set. Since the transverse position of the dot on the tape 10 is an indication of the instantaneous magnitude of the corresponding input signal, the duration the flip-flop remains set as an indication of the instantaneous magnitude of the corresponding input signal. The flip-flop circuits 120 to 125 are connected respectively to six integrating circuits 130 to 135. The output of the integrating circuits 130 to 135 is, accordingly, a series of pulses having magnitudes corresponding to the instantaneous amplitudes of the six input signals. The signals from the integrating circuits 130 to 135 are provided respectively through smoothing or filtering circuits 140 to 145 which recover the envelope by removing the higher frequencies so that the signals at the output terminals from the circuits 140 to 145 correspond to the original six input varying signals.

Figure 5:
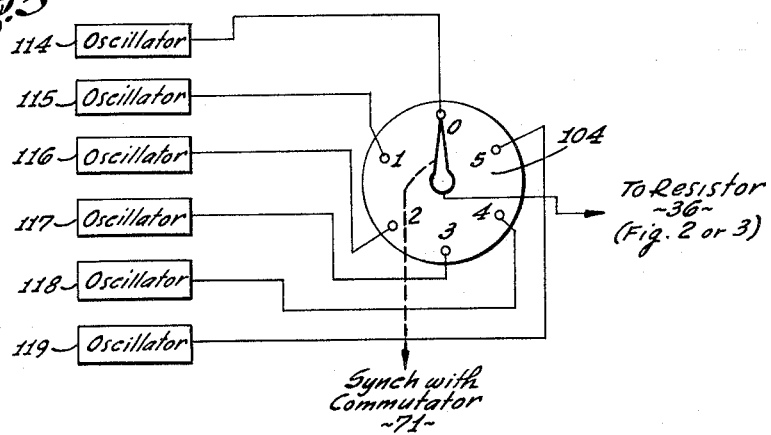
FIGURE 5 is a functional representation of a modulating circuit which can be used with the second embodiment of this invention.

As described above in reference to FIGURES 3 and 4, the curves or traces may be differently coded by gating the input signals. The traces may also be coded by varying the thickness of the traces in accordance with different patterns. In FIGURE 5, six oscillators 114 to 119 provide identifying frequencies and are coupled respectively to terminals 0 to 5 of a commutator 104. The signals from the oscillators 114 to 119 may have any shape. For example, they may be rectangular pulses or sinusoidal pulses. Further, the signals may be of different patterns of the type illustrated in FIGURE 4.

The commutator 104 is synchronously operated with the commutator 71 in FIGURE 3 so that the commutators 71 and 104 contact similarly designated terminals at the same time. The frequencies from the six oscillators may, illustratively, be 500, 1,000, 2,000, 4,000, 8,000 and 16,000 cycles per second. The commutator 104 samples the six frequencies and the sequentially sampled frequencies are provided from the commutator 104 to the junction of the resistor 36 and the electrode 17 in FIGURE 3. The potential at the electrode 17 is, accordingly, varied in accordance with the sequential signals from the commutator 104.

As described above, the charge on the electrode 17 determines the effective size of the electrostatic orifice and the rate the powder is provided through the slit 13. Each of the sampled pulses from the commutator 104, accordingly, varies the orifice size and, accordingly, the thickness of the trace. The commutator 104 is synchronized with the commutator 71 so that the variation of potential at the electrode 17 is determined by the oscillator 114 for the input varying signal from the circuit 40 in FIGURE 3; by the oscillator 115 for the signal from the circuit 41; etc. Due to the commutation, the effect of each of the oscillators 114 to 119 coincides with the sampling of an associated one of the input signals from the circuits 40 to 45.

The thickness of the trace corresponding to the signal from the circuit 40, accordingly, varies at a frequency determined by the oscillator 114, and the other five traces similarly vary in thicknesses at rates determined by the associated oscillators 115 to 119. The variation in thicknesses due to the variation of the charge on the electrode 17 may be detectable by the human eye so as to provide a visual identification of the different traces.

Although this application has been disclosed and illustrated with reference to particular applications, the principles involved are susceptible of numerous other applications which will be apparent to persons skilled in the art. For example, the principles of the present invention are not restricted to an embodiment where the input signal is applied to the electrode 15. If the electrode 16 in FIGURE 2 is isolated from ground by a resistor, the input signals could be applied thereto to provide for the same electrostatic transverse recording. The invention is, therefore, to be limited only as indicated by the scope of the appended claims.

I claim:

1. A system for recording a graphic representation of a varying signal in the form of recording powder on a recording medium, including,
    means for containing the recording powder and defining an opening proximate to the recording medium,
    means for establishing relative motion between the recording medium and the containing means,
    means including a pair of electrodes positioned adjacent the opening for establishing an electrostatic field across the opening for controlling the flow of the recording powder to the recording medium,
    means for introducing the varying signal to at least one of the pair of electrodes for varying the flow of the recording powder to the recording medium in accordance with the varying signal, one of said pair of electrodes being made of electrically resistive material, and the other of said pair of electrodes being made of electrically conductive material, and biasing means coupled to the resistive material electrode for establishing a potential gradient therealong and to the conductive material electrode for establishing a single potential therealong.

2. An oscillograph for providing a visible curve in the form of a trace of powder on a recording medium which trace represents a varying input signal, including, a container for the powder positioned adjacent the recording medium and having electrode means defining a slit opening adjacent the recording medium, means for establishing a relative motion between the recording medium and the container such that the direction of motion is transverse to the alignment of the slit opening of the container, circuit means including the electrode means of said container for establishing an electrostatic orifice at any position along the slit opening for the powder in said container to pass to the recording medium, and means for introducing the varying input signal to said establishing means for varying the position of the electrostatic orifice along the slit opening in accordance with the variations of the input signal.

3. An electrostatic recording system for providing curves formed of powder made of insulating material on a moving recording medium, including, means for receiving a plurality of varying signals to be recorded, means for successively sampling the varying signals to be recorded, means including a pair of electrodes extending across the moving recording medium in a direction transverse to the direction of movement of the recording medium, for establishing an electrostatic field normally blocking the passage of a powder to the moving recording medium, means for supporting the powder adjacent the pair of electrodes for passage of the powder through a zero potential orifice, if any, in the electrostatic field established by said establishing means, and means coupled to the sampling means for successively introducing the sampled signals from said sampling means to said establishing means for varying the electrostatic field to provide for a zero potential orifice at transverse positions relative to the moving recording medium which positions correspond to the sampled signals.

4. An electrostatic recording system in accordance with claim 3, including, switching means coupled to said sampling means for interrupting each of the varying signals in accordance with a different distinctive pattern so that the curves as recorded on the recording medium are readily identifiable.

5. A system for recording a graphic representation of a varying signal in the form of recording powder on a recording medium, including,
    means for containing the recording powder and defining an opening proximate to the recording medium,
    means for establishing relative motion between the recording medium and the containing means,
    means including a pair of electrodes positioned adjacent the opening for establishing an electrostatic field across the opening for controlling the flow of the recording powder to the recording medium,
    means for introducing the varying signal to at least one of the pair of electrodes for varying the flow of the recording powder to the recording medium in accordance with the varying signal,
    another electrode positioned adjacent the recording medium, and
    means for providing an electrostatic charge on said another electrode for attracting the powder to the recording medium and for maintaining the powder against the recording medium for an interval thereafter.

6. An oscillograph for providing a visible curve in the form of a trace of powder on a recording medium representing a varying input signal, including, a container for the powder positioned adjacent the recording medium and having electrode means defining a slit opening adjacent the recording medium, means for establishing a relative motion between the recording medium and the container such that the direction of motion is transverse to the alignment of the slit opening of the container, circuit means including the electrode means of said container for establishing an electrostatic orifice at any position along the slit opening for the powder in said container to pass to the recording medium, an electrode positioned relative to the recording medium for attracting powder through the electrostatic orifice to the recording medium, means for applying a biasing potential to said electrode, and means for introducing the varying input signal to said establishing means for varying the position of the electrostatic orifice along the slit opening in accordance with the variations of the input signal.

7. An oscillograph for providing a visible curve representing a varying input signal in accordance with claim 6, including, in addition, means for developing an electric signal having particular characteristics for identifying the curve formed by the powder on the recording medium which passed through the electrostatic orifice, and means coupled to said electrode for varying the potential on said electrode in accordance with the signal developed by said developing means whereby the amount of powder through the electrostatic orifice varies in accordance therewith to vary the thickness of the trace of powder on the recording medium.

8. An electrostatic oscillograph for providing a recording formed by fine particles of powder, including, a container for the powder and defining an opening, a first electrode having an elongate shape and made of electrically resistive material positioned adjacent the container along the opening in the container, biasing means coupled to the ends of the elongate shape of the first electrode for developing a continuous potential gradient along said first electrode, a second electrode having an elongate shape and positioned in a spaced relationship relative to said first electrode and adjacent the container along the opening in the container, said second electrode being made of electrically conductive material, biasing means coupled to said second electrode for establishing a predetermined biasing potential along said second electrode, a recording medium movable adjacent said first and said second electrode for receiving powder through the opening in the container and passing between the first and the second electrodes, means for moving the recording medium at a predetermined speed, and means for introducing an input signal to said first electrode for varying the level of the potential gradient across said first electrode whereby the point between the first and the second electrodes through which the powder is provided to the recording medium varies in accordance with the input signal.

9. An electrostatic system for recording curves formed by powder made of an insulating material on a moving recording medium, including, means for receiving a plurality of varying signals to be recorded, means for successively sampling the varying signals to be recorded, means including a pair of electrodes for establishing an electrostatic field normally extending across the moving recording medium in a direction transverse to the direction of movement of the recording medium for blocking the passage of the powder to the moving recording medium, means for supporting the powder adjacent the pair of electrodes for passage of the powder through a zero potential orifice, if any, in the electrostatic field established by said establishing means, means coupled to the sampling means for successively introducing the sampled signals from said sampling means for successively introducing the sampled signals from said sampling means to said establishing means for varying the electrostatic field to provide for a zero potential orifice at transverse positions relative to the moving recording medium corresponding to the sampled signals, a third electrode positioned relative to the recording medium for attracting the powder through the electrostatic field directly to the recording medium, and means for applying a biasing potential to said third electrode.

10. An electrostatic recording system in accordance with claim 9, including, in addition, a plurality of sources of different identifying signals for the different varying signals to be recorded, and means synchronized with said sampling means for introducing to said third electrode the identifying signal corresponding to the varying signal being introduced to said establishing means whereby the flow of the powder to the paper is varied in accordance therewith.

11. A system for recording a graphic representation of a varying signal on a moving recording medium, including: means defining a slit adjacent said recording medium and extending transversely to the direction of movement thereof; means for establishing an electrostatic field across said slit, said field varying in magnitude and direction along the extension of said slit; and means for varying said electrostatic field in response to a varying signal.

12. A system for recording a graphic representation of a varying signal on a moving recording medium, comprising: means defining an elongated slit extending transversely to the direction of movement of said recording medium and being positioned adjacent thereto, and including means for establishing an electrostatic field across said slit and having opposite directions in two different portions of said slit, there being a position defining a field-free electrostatic orifice; means for varying said electrostatic field in a direction transverse to the movement of said recording medium in accordance with the varying signal to vary the transverse position of said electrostatic orifice through which particles of powder are deposited on the recording medium; and means for applying heat to said recording medium to fuse thereto the particles of powder which have passed through said orifice.

13. A system for recording a graphic representation of a varying signal in the form of recording powder on a recording medium, including, means for containing the recording powder and defining an opening proximate to the recording meidum, means for establishing relative motion between the recording medium and the containing means, means including a pair of electrodes positioned adjacent the opening for establishing an electrostatic field across the opening for controlling the flow of the recording powder to the recording medium, means for introducing the varying signal to at least one of the pair of electrodes for varying the flow of the recording powder to the recording medium in accordance with the varying signal, and means coupled to said relative motion establishing means for providing a disabling potential to said pair of electrodes for inhibiting the flow of the recording powder when the relative speed between the medium and the containing means is not in a predetermined range of speeds.

14. A system for recording a graphic representation of a varying signal in the form of recording powder on a recording medium, including, means for containing the recording powder and defining an opening proximate to the recording medium, means for establishing relative motion between the recording medium and the containing means, means including a pair of electrodes positioned adjacent the opening for establishing an electrostatic field across the opening for controlling the flow of the recording powder to the recording medium, means for introducing the varying signal to at least one of the pair of electrodes for varying the flow of the recording powder to the recording medium in accordance with the varying signal, detector means coupled to the introducing means for recognizing the absence of the varying signal for a predetermined interval, and disabling means responsive to said detector means for providing a disabling potential to said electrode means to inhibit the flow of recording powder to the recording medium.

15. A system for recording a graphic representation of a varying signal in the form of recording powder on a recording medium, including, means for containing the recording powder and defining an opening proximate to the recording medium, means for establishing relative motion between the recording medium and the containing means, means including a pair of electrodes positioned adjacent the opening for establishing an electrostatic field across the opening for controlling the flow of the recording powder to the recording medium, means for introducing the varying signal to at least one of the pair of electrodes for varying the flow of the recording powder to the recording medium in accordance with the varying signal, another electrode positioned adjacent the recording medium, means for providing an electrostatic charge on said another electrode for attracting the powder to the recording medium and for maintaining the powder against the recording medium for an interval thereafter, and means for changing the electrostatic charge on said another electrode to vary the flow of the powder to the recording medium.

16. A system for recording a graphic representation of a varying signal on a moving recording medium, including, means for establishing an electrostatic field defining an electrostatic orifice for determining the transverse position of the recording medium upon which particles of powder are deposited, means for varying the electrostatic field to shift the electrostatic orifice in a direction transverse to the movement of the recording medium in accordance with the varying signal thereby to vary the transverse position of the recording medium upon which the particles of powder are deposited, and means for varying the electrostatic field to change the dimensions of the electrostatic orifice to change the magnitude of the flow of the powder through the orifice to the recording medium.

17. An oscillograph for providing a visible curve in the form of a trace of powder on a recording medium, which trace represents a varying input signal, including, a container for the powder positioned adjacent the recording medium and having electrode means defining a slit opening adjacent the recording medium, means for establishing a relative motion between the recording medium and the container such that the direction of motion is transverse to the alignment of the slit opening of the container, circuit means including the electrode means of said container for establishing an electrostatic orifice at any position along the slit opening for the powder in said container to pass to the recording medium, means for introducing the varying input signal to said establishing means for varying the position of the electrostatic orifice along the slit opening in accordance with the variations of the input signal, and means coupled to said container for vibrating said container in a direction perpendicular to the recording medium.

18. An electrostatic recording system for providing curves formed of powder made of insulating material on a moving recording medium, including, means for receiving a plurality of varying signals to be recorded, means for successively sampling the varying signals to be recorded, means including a pair of electrodes extending across the moving recording medium in a direction transverse to the direction of movement of the recording medium, for establishing an electrostatic field normally blocking the passage of a powder to the moving recording medium, means for supporting the powder adjacent the pair of electrodes for passage of the powder through a zero potential orifice, if any, in the electrostatic field established by said establishing means, means mechanically coupled to the powder for vibrating the powder back and forth in directions perpendicular to the moving recording medium, and means coupled to the sampling means for successively introducing the sampled signals from said sampling means to said establishing means for varying the electrostatic field to provide for a zero potential orifice at transverse positions relative to the moving recording medium which positions correspond to the sampled signals.

19. An oscillograph for providing a visible curve in the form of a trace of powder on a recording medium, which trace represents a varying input signal, including, a container for the powder positioned adjacent the recording medium and having electrode means defining a slit opening adjacent the recording medium, means for establishing a relative motion between the recording medium and the container such that the direction of motion is transverse to the alignment of the slit opening of the container, circuit means including the electrode means of said container for establishing an electrostatic orifice at any position along the slit opening for the powder in said container to pass to the recording medium, means for introducing the varying input signal to said establishing means for varying the position of the electrostatic orifice along the slit opening in accordance with the variations of the input signal, and means coupled to said introducing means for monitoring the varying input signal and for providing an inhibition potential to said establishing means when the input signal is not present.

20. In a system for recording a number of varying signals on a recording medium, means for sequentially sampling the varying signals one after the other to provide for each of the varying signals a series of spaced pulses indicative of the instantaneous magnitudes of the respective varying signal, a container of powder positioned adjacent the recording medium for depositing a thin stream of powder on the recording medium, means for establishing relative motion between the recording medium and the container, electrode means for establishing an electrostatic field between the container and the recording medium for determining the intensity of the stream of powder deposited upon the recording medium, biasing means coupled to said electrode means for normally inhibiting the stream of powder to the recording medium, and means coupled to the sampling means for introducing pulses from said sampling means to said electrode means for overcoming the inhibiting bias by said biasing means and for providing the stream of powder to positions on the recording medium in accordance with the pulses from the sampling means.

21. In a system for recording a number of varying signals on a recording medium, means for sequentially sampling the varying signals one after the other to provide for each of the varying signals a series of spaced pulses indicative of the instantaneous magnitudes of the respective varying signal, a container of powder positioned adjacent the recording medium for depositing a thin stream of powder on the recording medium, means for establishing relative motion between the recording medium and the container, electrode means for establishing an electrostatic field between the container and the recording for determining the position upon the recording medium that the stream of powder is deposited, biasing means coupled to said electrode means for normally inhibiting the stream of powder to the recording medium, means coupled to the sampling means for introducing pulses from said sampling means to said electrode means for overcoming the inhibiting bias by said biasing means and for providing the stream of powder to positions on the recording medium in accordance with the pulses from the sampling means, means for measuring the speed of the recording medium, and means coupled to said measuring means and to said electrode means for introducing an inhibiting potential to said electrode means when the speed of the recording medium is not in a predetermined range.

References Cited in the file of this patent

UNITED STATES PATENTS

| | | |
|---|---|---|
| 2,576,047 | Scharffert | Nov. 20, 1951 |
| 2,577,894 | Jacob | Dec. 11, 1951 |
| 2,676,868 | Jacob | Apr. 27, 1954 |
| 2,698,928 | Pulvari | Jan. 4, 1955 |
| 2,748,018 | Miller | May 29, 1956 |
| 2,829,025 | Clemens et al. | Apr. 1, 1958 |
| 2,883,557 | Gallo | Apr. 21, 1959 |
| 2,919,170 | Epstein | Dec. 29, 1959 |
| 2,961,547 | Snavely | Nov. 22, 1960 |